(No Model.)
G. L. K. MORROW.
PITMAN.
No. 357,130. Patented Feb. 1, 1887.
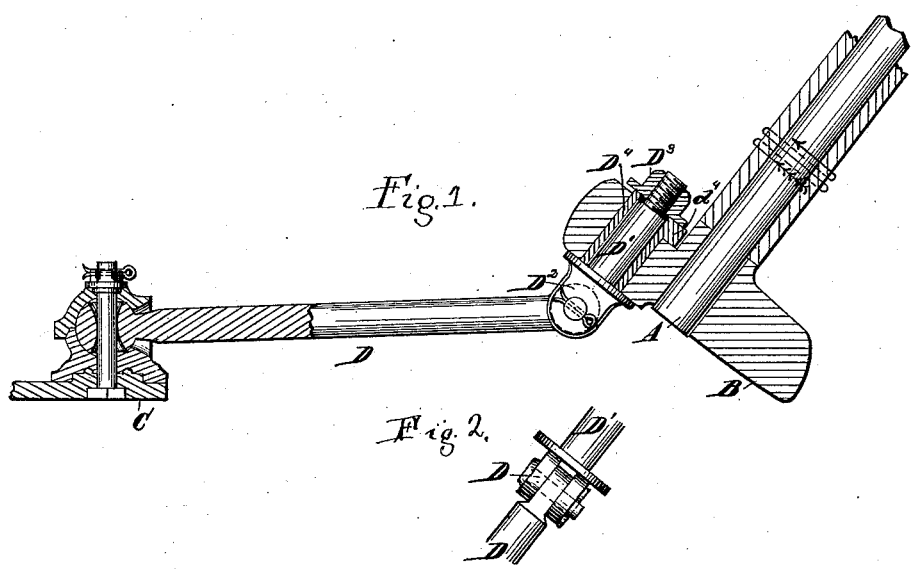
WITNESSES
INVENTOR

UNITED STATES PATENT OFFICE.

GEORGE L. K. MORROW, OF DETROIT, MICHIGAN, ASSIGNOR TO DEXTER M. FERRY, OF SAME PLACE.

PITMAN.

SPECIFICATION forming part of Letters Patent No. 357,130, dated February 1, 1887.

Application filed January 29, 1886. Serial No. 190,207. (No model.)

*To all whom it may concern:*

Be it known that I, GEORGE L. K. MORROW, of Detroit, county of Wayne, State of Michigan, have invented a new and useful Improvement in Pitmen for Mowing-Machines; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

In the drawings, Figure 1 is a sectional elevation, and Fig. 2 a detail view, of the parts of a mowing-machine or harvester, illustrating my invention.

This invention has particular relation to the pitman-connection between the rotary head within or supported by the radial arm of such a machine and the cutter-bar which derives its motion through the pitman from said rotary head. It is well known that the plane of rotation of the said rotary head is inclined to the plane within which the cutter is caused to travel, and consequently there is necessitated a universal movement at the extremities of the said pitman.

This invention relates more particularly to that connection at the end of the pitman adjacent to the revolving head, whereby it is connected with the said head.

In carrying out my invention, A represents the shaft that is contained within or supported by the radial arm of a mowing-machine or harvester, and whereby motion is communicated from the axle to the cutter-bar.

B is the rotary head at the lower end of the said shaft.

C is the cutter-bar or heel of the cutter-bar, being that part to which the power is usually applied for driving the cutters.

D is the pitman. This pitman may be provided with any suitable universal-joint connection with the cutter-bar, and its connection at that end of the pitman forms no part of the present invention, but is the subject of a claim in another application filed by me of even date herewith.

D' is a cylindrical bolt provided with a clevis-head, D², for the reception of the end of the pitman, the same being secured in place by a bolt and nut or spring-cotter, and the bolt D is passed through the rotary head B, and is provided with a nut, D³, at its outer end.

D⁴ is a bushing, held from turning by any suitable means—as, for instance, by a projection, d⁴, so that whenever wear has taken place to any extent upon the bolt or the bushing a new bushing can be inserted of thickness sufficient to compensate for the wear. The nut may be screwed down sufficiently tight, and be locked in position by any suitable means, although I prefer generally to so make the thread of the nut with respect to the revolution of the rotary head of such nature that the tendency in operation will be to keep the nut screwed down to its place. This is accomplished by threading the bolt in such a direction that to run the nut down upon it the nut will have to be turned in the same direction that the shaft A and the rotary head revolve. It is seen that by the contrivances here shown the bolt will turn within the rotary head as the latter revolves with the shaft A, and, in connection with a universal joint at the heel of the cutter-bar, will accomplish all the required purposes without binding at the rotary head or at the heel of the cutter-bar.

What I claim is—

1. The combination, with the pitman connecting the rotary head with the cutter-bar, of a cylindrical bolt passing through the rotary head and secured by a nut, the opposite end of said bolt being provided with a clevis-head for the reception of the end of the pitman, substantially as described.

2. The combination, with the pitman which communicates motion from the rotary head to the cutter-bar, of a cylindrical bolt passed through said head and secured by a nut at its extremity, and a bushing surrounding said bolt, said bolt provided with a clevis-head for the reception of the end of the pitman, substantially as described.

3. The combination, with the heel of the cutter-bar and the rotary driving-head, in a mowing-machine or harvester, of a pitman, D, provided with a universal-joint connection with the said heel of the cutter-bar and connected with the rotary head by a cylindrical bolt passing through the said head and held by a nut at its extremity, said bolt having a clevis at its other end for the reception of the extremity of the pitman, substantially as described.

In testimony whereof I sign this specification in the presence of two witnesses.

GEORGE L. K. MORROW.

Witnesses:
M. B. O'DOGHERTY,
N. S. WRIGHT.